United States Patent
Starnes, Jr.

(10) Patent No.: US 7,339,004 B2
(45) Date of Patent: Mar. 4, 2008

(54) PVC GRAFT COPOLYMER METHODS AND COMPOSITIONS

(75) Inventor: William H. Starnes, Jr., Williamsburg, VA (US)

(73) Assignee: College of William Mary, Williamsburg, VA (US)

(*) Notice: Subject to any disclaimer, the term of this patent is extended or adjusted under 35 U.S.C. 154(b) by 0 days.

(21) Appl. No.: 11/461,650

(22) Filed: Aug. 1, 2006

(65) Prior Publication Data

US 2007/0032602 A1 Feb. 8, 2007

Related U.S. Application Data

(60) Provisional application No. 60/704,680, filed on Aug. 2, 2005.

(51) Int. Cl.
*C08L 27/22* (2006.01)
*C08L 51/00* (2006.01)
(52) U.S. Cl. ............... 525/239; 525/245; 525/247; 525/317; 525/331.5; 525/332.5
(58) Field of Classification Search ............... 525/239, 525/245, 247, 317, 331.5, 332.3
See application file for complete search history.

(56) References Cited

U.S. PATENT DOCUMENTS

| 6,248,837 | B1 | 6/2001 | Chung et al. | |
|---|---|---|---|---|
| 6,284,850 | B1 | 9/2001 | Percec | |
| 6,437,044 | B1 | 8/2002 | Percec et al. | |
| 6,831,133 | B2 * | 12/2004 | Kennedy et al. | 525/313 |

* cited by examiner

*Primary Examiner*—Randy Gulakowski
*Assistant Examiner*—Olga Asinovsky
(74) *Attorney, Agent, or Firm*—Jason P. McDevitt

(57) ABSTRACT

Methods are described for preparing graft copolymers from poly(vinyl chloride) or vinyl chloride copolymers comprising reacting these materials with sources of selected metal-centered free radicals in the presence of one or more monomers that can undergo free-radical addition polymerization. The metal-centered free radicals used are capable of abstracting chlorine atoms from the starting polymer to form C-centered radicals that add to the monomer(s) in order to start the growth of branches via a free-radical route. This method is an effective method for producing PVC graft copolymers, and can be used to produce PVC graft copolymers having novel compositions. The methods of the invention are particularly useful for providing highly branched PVC graft copolymers.

5 Claims, No Drawings

PVC GRAFT COPOLYMER METHODS AND COMPOSITIONS

CROSS-REFERENCE TO RELATED APPLICATIONS

Pursuant to 35 U.S.C. §119, the benefit of priority from provisional application 60/704,680, with a filing date of Aug. 2, 2005, is claimed for this non-provisional application.

STATEMENT REGARDING FEDERALLY SPONSORED RESEARCH OR DEVELOPMENT

N/A

BACKGROUND OF THE INVENTION

The chemical combination of two or more incompatible polymers into sequential copolymers, i.e., block and graft copolymers, often leads to a unique combination of physical properties not originally present in either of the two component polymers or in their physical blends.

Poly(vinyl chloride) (PVC) has been one of the most widely used vinyl polymers in the world for more than 70 years. Graft copolymers derived from PVC are new materials whose physical properties may be improved considerably over those of PVC itself. Since the 1960s, anionic, cationic, and free-radical graft copolymerizations of PVC have been studied.

Anionic graft copolymers of PVC can generally be obtained from nucleophilic substitution reactions of chlorine atoms. As a result, a polymeric anion is grafted onto the PVC backbone. Appropriate displacement agents are characterized by a strongly nucleophilic character, while their basicity should be low in order to avoid base-promoted dehydrochlorination. In order to avoid undesirable termination of activity, air and polar species generally must be excluded, a major limitation of anionic grafting of PVC.

Cationic grafting involves the formation of a carbocation on the polymer backbone via abstraction of a chloride anion by a Lewis acid. Initiation of graft copolymerization then takes place from the polymeric cations, which form primarily at labile halogen sites such as allylic and tertiary chlorides. It may be preferable to increase the number of these labile sites by the prior dehydrochlorination of PVC or by the use of a copolymer of vinyl chloride with a monomer such as 2-chloropropene. However, these processes increase production costs and also introduce structural defects which, if not removed completely by graft formation, will decrease the thermal stability.

Cationic PVC grafting catalysts include the trialkylaluminums and dialkylaluminum monohalides. In general, for synthesis of PVC grafts, techniques using alkylaluminums (such as $Et_3Al$) are superior to earlier methods employing conventional Friedel-Crafts halides (such as $Et_2AlCl$), because the former processes are more readily controllable, so that gelation and degradation can thus be easily minimized or avoided. Hence, the products are cleaner and consequently easier to analyze. The electrophilic reactivity of polymeric cations precludes the use of monomers containing electron-withdrawing groups for cationic polymerization.

Free-radical grafting onto PVC is applicable to a larger number of monomers than the anionic and cationic methods. However, the resulting graft copolymers are always contaminated by a significant amount of free homopolymer; whereas both the anionic and cationic methods afford well-defined graft copolymers. This problem occurs because many types of initiator radicals will add competitively to the monomer that is to be grafted, thereby initiating homopolymerization during the free-radical grafting process.

Another disadvantage of the conventional radical graft copolymerization is intrinsic to the structure of PVC. If a chloromethylene hydrogen is abstracted, the branch point resulting from grafting with any monomer will incorporate tertiary chloride and thus be thermally labile.

Moreover, if a methylene hydrogen is abstracted, the resultant carbon-centered radical, instead of adding to the graftable monomer, may simply undergo a thermal loss of a chlorine atom to yield an unstable allylic chloride.

In summary, conventional free-radical grafting on PVC will introduce structural defects that will decrease the thermal stability of the resulting polymer.

Recently, U.S. Pat. No. 6,437,044 describes living radical graft polymerization from the structural defects of PVC by using metal catalysts. Well-defined PVC graft copolymers can be initiated directly from the structural defects available in the PVC backbone by radical abstraction of chlorine. Suitable catalysts include iron, cobalt, nickel, copper, ruthenium, rhodium, palladium and salts thereof, including iron chloride, iron bromide, nickel chloride, ruthenium chloride, rhodium chloride, and palladium acetate. Preferably, copper catalysts are utilized, including $Cu_2O$, $CuCl$, $CuBr$, $Cu_2S$, and $Cu_2Se$. Suitable monomers include methyl methacrylate, butyl methacrylate, tert-butyl methacrylate, butyl acrylate, methacrylonitrile, acrylonitrile, styrene, 4-chlorostyrene, 4-methylstyrene, and isobornyl methacrylate. However, the resulting copolymers are contaminated by the residual metal, and their compositions depend on the number of reactive structural defects in the starting PVC, or require starting PVC materials that are specially made to have a high number of allylic and/or tertiary chloride sites. Since the typical PVC formulation generally has from about 1 to about 5 and more often from about 2 to about 3 labile chlorine sites per 1,000 repeat units of PVC, there are limited branching sites.

There remains a need for a novel method of producing graft copolymers from PVC that lacks the deficiencies of the prior art.

BRIEF SUMMARY OF THE INVENTION

Methods are described for preparing graft copolymers from poly(vinyl chloride) or existing vinyl chloride copolymers comprising reacting these materials with sources of selected metal-centered free radicals in the presence of one or more monomers that can undergo free-radical addition polymerization. The metal-centered free radicals used are capable of abstracting Cl atoms from the starting polymer to form C-centered radicals that add to the monomer(s) in order to start the growth of branches via a free-radical route. Importantly, the Cl atoms do not have to arise from structural defects. Particularly labile species such as tertiary chlorides or allylic chlorides are not required, as secondary chlorides can be abstracted. The number of branches is dependent upon the concentration of the source of the metal-centered free radicals. The length of the branches is dependent upon the concentration of the added monomer(s).

More specifically, according to the methods of the invention, a poly(vinyl chloride) graft copolymer composition is prepared by:

(i) abstracting a chlorine atom from a PVC polymer to form a carbon-centered radical;

(ii) adding the carbon-centered radical to a monomer capable of undergoing free radical polymerization, thereby initiating a branch; and (iii) growing said branch via chain propagation;

wherein the chlorine atom is abstracted with a metal-centered free radical.

This method is an effective method for producing PVC graft copolymers and can be used to produce PVC graft polymers having novel compositions. The methods of the invention are particularly useful for providing highly branched PVC copolymers. In particular, preferred novel PVC copolymer compositions are prepared wherein the ratio of the number of repeat units in the poly(vinyl chloride) backbone to the number of copolymer branches is less than 30.

DETAILED DESCRIPTION OF THE INVENTION

As used herein, each of the following terms has the meaning associated with it as described below.

The articles "a" and "an" are used herein to refer to one or to more than one (i.e., to at least one) of the grammatical object of the article. By way of example, "an element" means one element or more than one element.

A "carbon-centered radical", as used herein, refers to a molecule having a radical species primarily associated with a carbon atom.

A "metal-centered radical", as used herein, refers to a molecule having a radical species primarily associated with a metal atom. For example, $Bu_3Sn\cdot$ is an example of a metal-centered radical species.

Graft copolymers of PVC are prepared from PVC starting materials by:

(i) using a metal-centered radical to abstract a chlorine atom from a PVC polymer, thereby forming a carbon-centered radical;

(ii) initiating branching by adding the carbon-centered radical to a monomer capable of undergoing free radical polymerization; and (iii) growing the resulting branch via chain propagation.

There is a competition for reaction with monomer between the metal-centered radical and the C-centered radicals from PVC, as depicted in the scheme below,

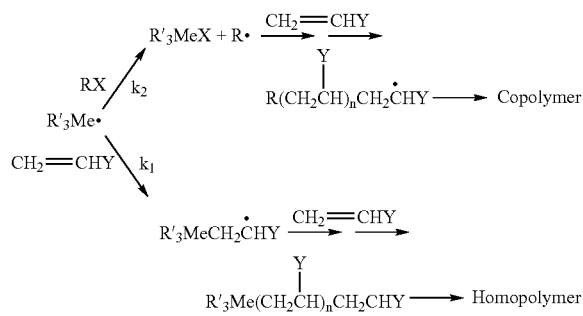

where RX is an aliphatic halide such as PVC; R' is an alkyl or aryl group; Me is a metal atom such as tin; $k_1$ and $k_2$ are rate constants; and Y represents a variety of groups that will allow the monomers that contain them to polymerize in a radical process.

In order for the grafting reaction to be clean, the initiation of homopolymerization must be unimportant. Two possible methods of overcoming this difficulty are apparent. One method is to choose graftable monomers that show relatively low values of $k_1$. Another method is to increase the concentration of PVC relative to that of the monomer. Suitable metal-centered radicals include radicals of tin, germanium, or other species appropriate for the task. In particular, radicals of the type $R'_3Me\cdot$ are useful according to the methods of the invention. For example, $Bu_3Sn\cdot$ is capable of abstracting a chlorine atom from PVC. $Bu_3Ge\cdot$ is another metal-centered radical contemplated by the methods of the invention. Silicon radicals may also be effective.

These metal-centered radicals may be formed by photolytic methods. For example, $Bu_3SnSnBu_3$ may be cleaved photolytically to yield the desired $Bu_3Sn\cdot$ radical species.

The amount of metal-centered radicals used according to the methods of the invention will vary based on the grafting monomer selected and the number of branches desired. Generally, metal-centered radicals, or precursors thereof, will be added at a level from about 0.001 to about 0.1 moles of metal-centered radical per mole of repeat units of PVC.

Suitable monomers for propagating the branches include vinyl acetate, isobutylene, vinylidene chloride, vinyl chloride, vinyl esters having a total of from 4 to about 20 carbon atoms, vinyl ethers having a total of from 3 to about 30 carbon atoms, and styrene. Less preferred monomers include maleic anhydride, acrylonitrile, methyl acrylate, and ethyl acrylate, which contain electron-withdrawing groups.

Preparation of Graft Copolymers According to the Methods of the Invention can be carried out in the presence of a metal-centered free radical source in a closed vessel in an inert atmosphere such as nitrogen, carbon dioxide, or argon; under autogenous pressure induced by the monomer and/or solvent; or artificially induced pressure; or optionally under reflux at pressures ranging from a vacuum up to about 10,000 psi, and particularly from about 0.001 to about 2 atmospheres. The temperature of the polymerization can vary widely depending upon the type of monomer and/or radical source but is generally from about 25° C. to 200° C. Alternatively, the graft copolymers can be prepared by using appropriate solvents such as organic fluids or mixtures of organic fluids to dissolve or swell the PVC starting material. Naturally, solvents which do not interfere with the reaction are used, and suitable solvents include ketones such as cyclohexanone, cyclopentanone, and methyl ethyl ketone; benzene derivatives such as toluene, xylene, and 1,2-dichlorobenzene; ethers such as diphenylether; and esters such as ethylene carbonate, dioctyl phthalate, or any of the other solvents for PVC and the copolymer known to those skilled in the art. Generally, any solvent that dissolves or swells the graft copolymer and the PVC and does not inhibit the reaction can be utilized. It is noted, however, that all such solvents will act as chain transfer agents and thereby decrease the molecular weights and numbers of the braches formed by grafting. Generally, however, any solvent capable of swelling the copolymer is suitable. Alternatively, grafting onto the PVC polymer can be carried out in the absence of solvent. Where solvent is absent, the excess monomer assists in solubilizing or swelling the polymer mixture.

These methods are not limited to PVC, but also can work with most linear-type vinyl chloride copolymers and with vinylidene chloride linear copolymers.

The copolymers produced according to the methods of the invention can have a much higher degree of branching than PVC copolymers made according to the methods of the prior art. For example, in some novel compositions, the ratio of the number of repeat units in the poly(vinyl chloride) backbone to the number of copolymer branches is less than 100. In other embodiments, the ratio of the number of repeat units in the poly(vinyl chloride) backbone to the number of copolymer branches is less than 30, and in selected embodiments, the ratio is less than 10.

The PVC graft copolymer compositions described herein are useful in many applications apparent to those skilled in the art. In particular, relative to standard PVC, these graft copolymer compositions can have improved processability.

EXAMPLES

The invention is now described with reference to the following examples. These examples are provided for the purpose of illustration only and the invention should in no way be construed as being limited to these examples but rather should be construed to encompass any and all variations which become evident as a result of the teaching provided herein. Details of these experiments appear in: "A new approach to the synthesis of PVC graft copolymers", by G. Chen, M. S. Thesis, College of William and Mary, 2005.

The following equipment, materials, and procedures were used in the examples provided below.

GC/MS was performed with a Hewlett-Packard 6890 Series GC instrument, which was equipped with a cross-linked methylsiloxane capillary column (30 m×0.25 mm×0.25 µm) and used in conjunction with a Hewlett-Packard 5973N Mass Selective Detector. Sample data were analyzed by using Hewlett-Packard 21CFR11 software for the MS ChemStation.

Infrared spectroscopy was performed on films cast from dilute THF solutions, using a Perkin-Elmer 1600 Series FTIR instrument.

Melting points were determined by using a UniMelt (Thomas Hoover) capillary melting point apparatus.

NMR spectra were acquired at ambient temperature with a Varian 400-MHz instrument. Data processing was performed by using Tecmag MacNMR 5.4 software. Chemical shifts are reported in ppm ($\delta$) with TMS ($Me_4Si$) as internal reference ($\delta$=0.00 ppm); chloroform-d and tetrahydrofuran-$d_8$ were used as solvents.

Thermogravimetric analysis was conducted with a Seiko SSC 5040 Thermal Analysis System. This system included a TG/DTA 200 simultaneous thermogravimetric/differential thermal analyzer with Version 2.0 system software. Sample masses were about 10 mg, and the nitrogen flow rate was set at about 30 mL/min.

Differential scanning calorimetry (DSC) was performed by using a Perkin-Elmer 7 Series Thermal Analysis System (DSC7) and a TAC7 instrument controller.

Photochemical reactions were performed by using a photochemical reactor (Catalog No. RPR-100) manufactured by the Southern New England Ultraviolet Company. Rayonet photochemical reactor lamps (Catalog No. RPR-2537A) came from the same supplier.

Example 1

Determination of Abstraction/Addition Rate Constant Ratio for the Model Compound 2-Chlorobutane and Vinyl Acetate The reaction was carried out in an airtight system. To a 50-mL one-neck round-bottom flask containing a magnetic stirring bar were added 0.020 g (0.12 mmol) of AIBN, 2.523 g (8.67 mmol) of tributyltin hydride, 1.052 g (12.22 mmol) of vinyl acetate, and 0.581 g (6.28 mmol) of 2-chlorobutane. After three freeze-vacuum-thaw cycles using liquid nitrogen, the flask was heated with stirring for three hours in a silicone oil bath at 50±3° C. and cooled to room temperature. The product mixture was analyzed by $^1H$ and proton-decoupled $^{13}C$ NMR spectroscopy in chloroform-d solution. Then THF (16.5 mL) and 0.123 g of an internal standard, n-tridecane, were added, and after an additional 20 minutes of stirring at ice-water temperature, the mixture was analyzed by GC/MS.

The experiment was repeated several times with different $Bu_3SnH$:vinyl acetate:2-chlorobutane molar ratios.

The value of $k_2/k_1$ was calculated for each run from the initial and final compositions of the reaction mixture, and the mean value was found to be 3.95±0.61. This result shows that vinyl acetate is an appropriate monomer for use in the grafting method of the present invention.

Example 2

Preparation of PVC-g-PVAc

To a quartz flask containing a magnetic stirring bar were added 2.01 g (32.2 mmol monomer units) of PVC, 10.00 g (116.2 mmol) of vinyl acetate (VAc), 0.40 g (0.69 mmol) of hexa-n-butylditin, and 105 mL of THF. The flask was stoppered, and the contents were stirred until the PVC dissolved completely. Then the flask was cooled in Dry Ice, and the solution was degassed for 25 minutes with flowing argon, allowed to warm to room temperature, and irradiated in the UV reactor for 24 hours. Following the addition of 50 mL of fresh THF and filtering through paper to remove degraded polymer, the solution was poured into a large excess of methanol, with stirring, and the polymeric product was isolated by suction filtration. It was then redissolved in THF, precipitated again into methanol, recovered by suction filtration, subjected to Soxhlet extraction with methanol for 36 hours, and dried under vacuum at 50° C. The yield was 1.80 g.

For NMR analysis, the copolymer (0.06 g) was dissolved in tetrahydrofuran-$d_8$ (0.54 g) containing TMS ($Me_4Si$) as an internal reference. Spectra were recorded at room temperature using 16 scans for the $^1H$ spectrum and 20,000 scans for the $^{13}C$ spectrum. For the $^{13}C$ spectrum, the pulse interval was three seconds, and the pulse angle was 45°. By comparing the spectra of the copolymer with those of authentic samples of the PVC and poly(vinyl acetate) (PVAc) homopolymers, it was possible to establish the presence of blocks of PVAc in the copolymer specimen.

Analysis of the copolymer by GPC showed a monomodal molecular weight distribution and a significant shift of the peak value toward higher molecular weight. The GPC data indicated $M_w$ and $M_n$ values of 104,100 and 44,400, respectively, for the copolymer, whereas the corresponding values for the starting PVC were found to be 68,800 and 24,800, respectively.

For FTIR analysis, the samples were made into films by casting from dilute THF solutions. In a typical preparation, 80 mg of graft copolymer or PVC was dissolved in THF (2 mL), and the solution was allowed to evaporate at room temperature. The resulting film was dried under vacuum at 25° C. and examined at 2 $cm^{-1}$ resolution, using 128 scans. As a result, the presence of vinyl acetate monomer units in the copolymer was confirmed by the appearance of a strong band at 1747 $cm^{-1}$ that is characteristic for ester carbonyl stretching and is absent from the FTIR spectrum of PVC itself.

Analysis of the copolymer by DSC revealed only one glass transition temperature ($T_g$) at 46.1° C., whereas the $T_g$ of the original PVC was 73.3° C., and that of PVAc is known to be about 30° C. A single new $T_g$ indicates the absence of PVC and PVAc microphases from the copolymer. This result is to be expected, because PVC and PVAc are generally considered to be miscible.

Examination by TGA indicated an initial weight loss from PVC starting at 245° C., continuing rapidly up to 350° C., and ending around 420° C. Under identical conditions, the copolymer began to lose weight at 206° C., but up until about 320° C., the rate of its subsequent weight loss was less than that of the PVC.

All of the foregoing observations provide conclusive evidence for the synthesis of PVC-g-PVAc by the process of the present invention.

Example 3

Determination of Abstraction/Addition Rate Constant Ratio for the Model Compound 2-Chlorobutane and Isobutylene By using a procedure analogous to that described in Example 1, $Bu_3Sn$. radicals formed from tributyltin hydride and AIBN were allowed to react with various mole ratios of isobutylene:2-chlorobutane. The value of $k_2/k_1$ was calculated for each run from the initial and final compositions of the reaction mixture, determined as described in Example 1, and the mean value was found to be 62.9±7.6. This result shows that isobutylene is an appropriate monomer for use in the grafting method of the present invention.

Example 4

Preparation of PVC-g-Polyisobutylene

To a quartz flask containing a magnetic stirring bar were added 2.01 g (32.2 mmol monomer units) of PVC, 1.00 g (1.73 mmol) of hexa-n-butylditin, and 101 mL of THF. The flask was stoppered, and the contents were stirred until the PVC dissolved completely. Then the flask was cooled in Dry Ice, and the solution was degassed for 25 minutes with flowing argon. Subsequently, isobutylene (9.47 g, 169 mmol) was introduced at Dry Ice temperature, and after being allowed to warm to room temperature, the flask was irradiated in the UV reactor for 24 hours. Following the addition of 50 mL of fresh THF and filtering through paper to remove degraded polymer, the solution was poured into a large excess of methanol, with stirring, and the polymeric product was isolated by suction filtration. It was then redissolved in a very large amount of THF, precipitated again into methanol, recovered by suction filtration, subjected to Soxhlet extraction with n-pentane for 36 hours, and dried under vacuum at 50° C. The resulting yield was 1.40 g.

Analysis of the product by GPC showed a monomodal molecular weight distribution and an $M_w$ of 95,200, as compared to the value of 68,800 found for the starting PVC. A DSC trace obtained for the product revealed no distinct $T_g$. Examination by TGA indicated an onset temperature for weight loss of approximately 200° C., and a subsequent loss in weight which was slower than that of PVC itself. A suitable solvent for NMR analysis of the product was not identified.

All of the foregoing observations support the conclusion that PVC-g-Polyisobutylene was prepared by the process of the present invention.

All publications and patent applications mentioned in the specification are indicative of the level of those skilled in the art to which this invention pertains. Although the foregoing invention has been described in some detail by way of illustration and example for purposes of clarity of understanding, it will be obvious that certain changes and modifications may be practiced within the scope of the representative embodiments of these concepts presented below. The appended claims are intended to be construed to include all such embodiments and equivalent variations

I claim:

1. A process for preparing a poly(vinyl chloride) graft copolymer composition comprising the steps of:
   (i) abstracting a chlorine atom from a PVC polymer to form a carbon-centered radical;
   (ii) adding the carbon-centered radical to a monomer capable of undergoing free radical polymerization, thereby initiating a branch; and
   (iii) growing said branch via chain propagation;
wherein said step of abstracting a chlorine atom is performed using a metal-centered free radical.

2. The process of claim 1, wherein said metal-centered free radical is a tin radical species.

3. The process of claim 1, wherein said monomer is selected from the group consisting of vinyl acetate, isobutylene, vinylidene chloride, vinyl chloride, vinyl esters having a total of from 4 to about 20 carbon atoms, vinyl ethers having a total of from 3 to about 30 carbon atoms, and styrene.

4. The process of claim 1, wherein the number of branches formed is greater than or equal to 1% of the number of repeat units in the PVC backbone.

5. The process of claim 1, wherein the number of branches formed is greater than or equal to 10% of the number of repeat units in the PVC backbone.

* * * * *

UNITED STATES PATENT AND TRADEMARK OFFICE
CERTIFICATE OF CORRECTION

PATENT NO. : 7,339,004 B2 Page 1 of 1
APPLICATION NO. : 11/461650
DATED : March 4, 2008
INVENTOR(S) : William H. Starnes, Jr.

It is certified that error appears in the above-identified patent and that said Letters Patent is hereby corrected as shown below:

Column 3,

Line 60, please replace " $\overset{\cdot}{R}_3 Me(CH_2 \overset{Y}{\underset{|}{C}H})_n CH_2 CHY$ " with -- $\overset{\cdot}{R}_3 Me(CH_2 \overset{Y}{\underset{|}{C}H})_n CH_2 \overset{\bullet}{C}HY$ --.

Column 4,
Line 55, please replace "braches" with --branches--.

Column 5,
Line 27, please replace "30   mx0.25" with --30 m x 0.25--.

Column 5,
Line 28, please replace "mmx0.25" with --mm x 0.25--.

Signed and Sealed this

First Day of July, 2008

JON W. DUDAS
*Director of the United States Patent and Trademark Office*